US006861971B2

(12) United States Patent
Russo et al.

(10) Patent No.: US 6,861,971 B2
(45) Date of Patent: Mar. 1, 2005

(54) TRANSPONDER HAVING HIGH PHASE STABILITY, PARTICULARLY FOR SYNTHETIC APERTURE RADAR, OR SAR, SYSTEMS

(75) Inventors: Pasquale Russo, Rome (IT); Alessandro Rosa, Rome (IT); Annamria D'Ippolito, Rome (IT)

(73) Assignee: Tes Teleinformatica E Sistemi s.r.l. (IT)

( * ) Notice: Subject to any disclaimer, the term of this patent is extended or adjusted under 35 U.S.C. 154(b) by 0 days.

(21) Appl. No.: 10/479,844

(22) PCT Filed: Jun. 7, 2002

(86) PCT No.: PCT/IT02/00378

§ 371 (c)(1),
(2), (4) Date: Dec. 8, 2003

(87) PCT Pub. No.: WO02/101410

PCT Pub. Date: Dec. 19, 2002

(65) Prior Publication Data

US 2004/0233096 A1 Nov. 25, 2004

(30) Foreign Application Priority Data

Jun. 8, 2001 (IT) .................................... RM2001A0323

(51) Int. Cl.[7] .......................... G01S 13/90; G01S 13/74

(52) U.S. Cl. ..................... 342/25 R; 342/25 A; 342/42; 342/43; 342/51; 342/175; 342/176; 342/179; 342/188; 342/190; 342/191; 342/195

(58) Field of Search ....... 343/700 MS; 342/25 R–25 F, 342/42–51, 175, 176, 179, 188–197

(56) References Cited

U.S. PATENT DOCUMENTS 4,490,719 A * 12/1984 Botwin et al. .............. 342/188
4,829,303 A * 5/1989 Zebker et al. ............ 342/25 R
5,057,843 A * 10/1991 Dubois et al. ............ 342/25 R
5,313,210 A * 5/1994 Gail ......................... 342/25 R
5,568,086 A 10/1996 Schuss et al.
5,614,909 A 3/1997 Komatsu et al.
5,767,802 A * 6/1998 Kosowsky et al. ........... 342/45
5,821,895 A * 10/1998 Hounam et al. .......... 342/25 R
6,359,584 B1 * 3/2002 Cordey et al. .............. 342/195
6,781,540 B1 * 8/2004 MacKey et al. ............ 342/188

FOREIGN PATENT DOCUMENTS

EP 0473981 A2 3/1992

* cited by examiner

*Primary Examiner*—Bernarr E. Gregory
(74) *Attorney, Agent, or Firm*—Hunton & Williams LLP

(57) ABSTRACT

A transceiver or transponder particularly for synthetic aperture radar, or SAR, systems, operating in a frequency band having a central frequency, the transponder comprising a receiver (1) and a transmitter (2) both thermally stable and made by microstrip technology, the receiver (1) and the transmitter (2) being adapted to receive and to transmit, respectively, an electromagnetic wave provided with at least one linear polarisation, the receiver (1) being connected to the transmitter (2) by amplifier means comprising an amplifier unit (5) for each linear polarisation of the wave received by the receiver (1), each amplifier unit (5) including at least two amplifier stages (7, 9, 11) cascade arranged along a single microstrip and interconnected to one another and to an input and to an output of the corresponding amplifier unit (5) by means of coupling or matching stages (6, 8, 10, 12), the output signal of each amplifier unit (5) having substantially the same frequency as the input signal thereto, the amplifier units (5) having substantially the same gain, the gain being no lower than 25 dB, the transponder being phase stable so that each linear polarisation of the transmitted electromagnetic wave has phase variations in time no higher than 20°, the transponder further comprising electromagnetic decoupling means (4, 14) between the transmitter (2) and the receiver (1).

51 Claims, 8 Drawing Sheets

TRANSPONDER HAVING HIGH PHASE STABILITY, PARTICULARLY FOR SYNTHETIC APERTURE RADAR, OR SAR, SYSTEMS

RELATED APPLICATIONS

This application is a United States National Phase application based on PCT/IT02/00378 which was filed on Jun. 7, 2002, entitled "Transponder Having High Phase Stability, Particularly for Synthetic Aperture Radar, or SAR, Systems" the subject matter of which is hereby incorporated by reference in its entirety. In addition, PCT/IT02/00378 was based on Italian Patent Application No. RM2001A000323 filed on Jun. 8, 2001, the entirety of which is also incorporated by reference.

FIELD OF THE INVENTION

This invention relates to a high phase stability transceiver or transponder particularly useable in Synthetic Aperture Radar (or SAR) apparatuses, which, upon receiving a signal, enables in reliable, simple and efficient way, to transmit an amplified signal having the same frequency as the received signal and a time stable phase relationship with it, the transponder turning out to be extremely inexpensive and to have extremely reduced dimensions.

It is known that a synthetic aperture radar or SAR apparatus is a microwave active distance survey apparatus that is installed on board of aircraft or satellites and enables high resolution images of the observed scene to be generated, regardless of the meteorologic conditions or of the presence of sun light. Generally the wavelength of the microwaves utilised in such a SAR system is in the range of 3 cm to 30 cm.

The survey resolution substantially depends on the frequency of transmitted radar signal, on the aperture of the antenna beam as well as on the distance between the radar system and the surface to be surveyed.

In all those applications requiring a continuous monitoring operation, such as the Ground Motion Monitoring, the radar system is preferably installed on board of a satellite. In spite of the great range at which such a radar system operates, equal to about 800 km, the SAR technology allows a high spatial resolution to be achieved by means of a processing operation carried out on the echo signal reflected from the surface irradiated by the transmitted signal. In particular, such processing operation performs a focalisation of the image that synthesises the reflected echo signal in order to simulate an antenna aperture having a noticeably enlarged dimension with respect to the antenna as effectively installed on board of the aircraft.

One of the characteristics of a SAR system is its capability to track both the amplitude behaviour and the phase behaviour of the back reflected echo signal. In those cases in which two SAR images of the same scene are obtained from slightly different observation angles, thereby forming a so called stereoscopic pair or "stereo pair", their phase difference, which generates their interference fringes, can be advantageously exploited for generating Digital Elevation Maps or DEMs in order to monitor the terrain variations and to improve the distance resolution or range.

In some applications, such as the Ground Motion Monitoring, the presence of permanent targets or PT on the surveyed territory enables any terrain variations to be detected by analysing time sequences of the images obtained from the same scene. Such Permanent Targets have radio diffusion properties that are known to the SAR system and that are maintained stable in the time. In particular, the technique utilising such PTs, that can be both artificial and natural, is designated as external calibration.

The present conventional PTs are passive devices, among which the most generally utilised are the ones known to those skilled in the art as "corner reflectors", particularly the triangular trihedron ones. Each device covers a geometric area much smaller than a single resolution cell of the scene. Aiming a minimising the errors caused by the noise generated by the surrounding environment, the radar echo section or RCS (Radar Cross Section) of the PT should be by at least 20 dB higher than the total power diffused by the corresponding resolution cell of the SAR image.

The passive corner reflectors have noticeable external dimensions and weight and, therefore, this causes some drawbacks.

In the first place, the passive corner reflectors make the repeatability of the antenna direction particularly complex.

In addition, the required realisation tolerances of the passive corner reflectors are very severe.

Furthermore, the dimension variations due for instance to thermal variations jeopardise the detection accuracy of the concerned SAR system.

Lastly, the scarce manoeuvrability of the passive corner reflectors complicates their installation on the territory to be surveyed and prohibits their exploitation in all those applications which require a large number of such devices to be used.

In order to reduce the weight and the complexity of the Permanent Targets, a possible alternative is based upon use of an active antenna transponder.

In any case, the specific application requires that the re-transmitted signal have the same frequency as the received signal and have a time stable phase relationship with the received signal and further that the receive antenna and the transmit antenna have such a pointing direction as to substantially cover the same space portion: this made the realisation of such a passive PT up to now extremely complex and expensive.

SUMMARY OF THE INVENTION

It is an object of this invention, therefore, to provide an active antenna transponder having reduced dimensions, adapted to be utilised as an active PT, thereby enabling in reliable, simple and inexpensive way to transmit an amplified signal having the same frequency as the received signal and a time stable phase relationship with the received signal, with irradiation of the transmitted signal in the same direction from which the received signal arrives.

It is specific subject matter of this invention a transceiver or transponder particularly for synthetic aperture radar, or SAR, systems, operating in a frequency band having a central frequency, the transponder comprising a receiver and a transmitter both thermally stable and realised (or made) by microstrip technology, the receiver and the transmitter being adapted to receive and to transmit, respectively, an electromagnetic wave provided with at least one linear polarisation, the receiver being connected to the transmitter by amplifier means comprising an amplifier unit for each linear polarisation of the wave received by the receiver, each amplifier unit including at least two amplifier stages cascade arranged along a single microstrip and interconnected to one another and to an input and to an output of the corresponding amplifier unit by means of coupling or matching stages, the output signal of each amplifier unit having substantially the same frequency as the input signal thereto, the amplifier units having substantially the same gain, the gain being no lower than 25 dB, the transponder being phase stable so that each linear polarisation of the transmitted electromagnetic wave has phase variations in time no higher than 20°, the transponder further comprising electromagnetic decoupling means between the transmitter and the receiver.

Preferably, according to this invention, the transponder is phase stable so that each linear polarisation of the transmitted electromagnetic wave has phase variations in the time no higher than 15°.

Also according to this invention, the amplifier means comprise a band pass filter made in microstrip technology, connected to the input of each amplifier unit.

Again according to this invention, each band pass filter has a pass band no less than 10% of the central frequency of the operation band of the transponder, more preferably no less than 15% of the central frequency of the operation band of the transponder and even more preferably no less than 20% of the central frequency of the operation band of the transponder.

Further according to this invention, each band pass filter introduces an attenuation no higher than 5 dB and more preferably no higher than 2 dB.

Again according to this invention, the amplifier means have a phase stability such that the output signal of each amplifier unit has phase variations in time no higher than 15°, preferably no higher than 9°.

Further according to this invention, the amplifier units can have a gain no lower than 35 dB, preferably no lower than 40 dB.

Additionally according to this invention, the amplifier means can have a Noise Figure or NF value no higher than 5 dB, preferably no higher than 2 dB.

Preferably, according to this invention, the receiver and the transmitter have a frequency band of no less than 10% of the central frequency of the operation band of the transponder, more preferably no less than 15% of the central frequency of the operation band of the transponder and even more preferably no less than 20% of the central frequency of the operation band of the transponder.

Still according to this invention, the receiver can have such a phase stability as to introduce into the received electromagnetic wave a phase variation in time of no more than 5°, preferably of no more than 3°, and the transmitter can have such a phase stability that the transmitted electromagnetic wave has a phase variation in time of no more than 5°, preferably of no more than 3°.

Again according to this invention, the transponder can be adapted to operate at temperature values in the range of −40° C. to +80° C.

Preferably according to this invention, the receiver and the transmitter each comprise at least one micro strip radiating element or patch, arranged on a support surface made of a thermally stable material.

Further according to this invention, the receiver and the transmitter can each comprise a single patch.

Still according to this invention, the receiver and the transmitter can each comprise a square array of 2×2 patches.

Again according to this invention, the support can be made of a laminated dielectric dual-plated material, preferably comprising Duroid.

Further according to this invention, at least one amplifying stage can include a pseudomorphic high electron mobility transistor (PHEMT) stage.

Still according to this invention, at least one matching stage can include a coupling network.

Again according to this invention, at least one matching stage can include a 50 ohm planar coupling line.

Preferably according to this invention, the amplifier means are directly integrated at the output of the receiver, so that each amplifier unit is directly integrated on each connection microstrip between a corresponding output of the receiver and a corresponding input of the transmitter.

Additionally according to this invention, each band pass filter can be directly integrated on the microstrip of the corresponding amplifier unit.

Further according to this invention, each amplifier unit can include three amplifying stages.

Again according to this invention, each amplifier unit can include four amplifying stages.

Still according to this invention, the transponder can have a radar cross section or RCS figure of no less than 20 dBsqm, preferably of no less than 25 dBsqm, more preferably of no less than 30 dBsqm and even more preferably of no less than 34 dBsqm.

Further according to this invention, the receiver and/or the transmitter can have an antenna gain in the range of 6 dBi to 18 dBi.

Preferably according to this invention, the transponder operates in class C.

Further according to this invention, the transponder can be provided with a power supply comprising a digital control unit adapted to periodically activate the transponder only for a limited time duration.

Again according to this invention, the power supply can be provided with one or more long duration or low discharge batteries.

Still according to this invention, the power supply can be provided with one or more solar cells.

According to this invention, the de-coupling means between the transmitter and the receiver can include at least one metal diaphragm.

Still according to this invention, the de-coupling means between the transmitter and the receiver can further include one or more radio frequency signal absorber panels adapted to absorb the radiation irradiated from the transmitter to the receiver.

Further according to this invention, the absorber panels can be laterally and parallel arranged with respect to the at least one metal diaphragm.

Again according to this invention, the de-coupling means between the transmitter and the receiver include at least a portion of a radome made with a material having a negligible impact on the radiative properties of the receiver and of the transmitter at the operation frequencies as well as a shape and a thickness adapted to make the reflection of the wave irradiated from the transmitter to the receiver substantially negligible.

Preferably according to this invention, the material of the portion of the radome comprises fibre glass and/or Teflon.

Further according to this invention, the portion of the radome can have a cylindrical sector shape with an angular width $\alpha$ no greater than 90°, preferably no greater than 60°.

Additionally according to this invention, the portion of the radome has a thickness no greater than 0.5 mm, preferably no greater than 0.2 mm.

BRIEF DESCRIPTION OF THE FIGURES

This invention will be now described by way of illustration, not by way of limitation, according to its pre ferred embodiments, by particularly referring to the Figures of the annexed drawings, in which.

DETAILED DESCRIPTION OF VARIOUS EMBODIMENTS

Figure 1:
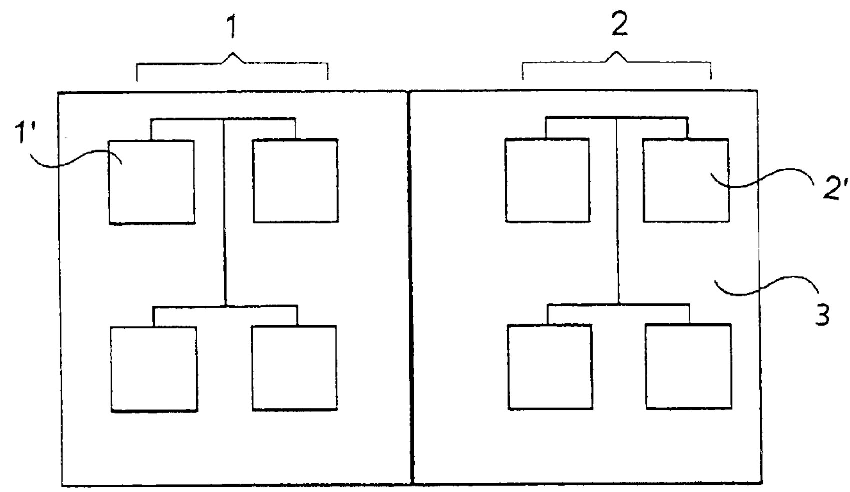
FIG. 1 shows a top plan view of a first embodiment of the transponder according to this invention.

The same reference numerals will be utilised in the following description to designate the same items in the Figures.

Figure 2:
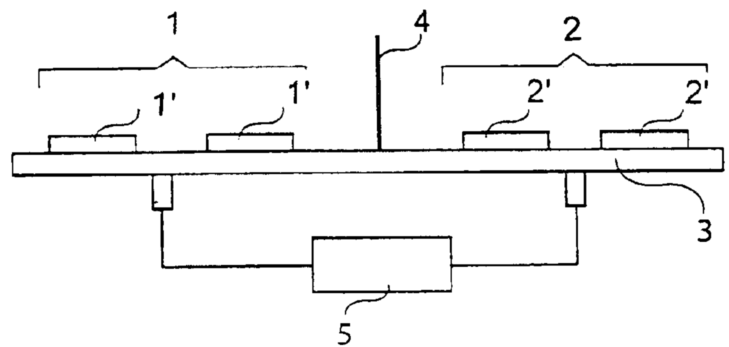
FIG. 2 shows a front view of the transponder of FIG. 1.

By referring now to FIGS. 1 and 2, it can be observed that the first embodiment of the transponder according to this invention comprises a receiver 1 and a transmitter 2, both made in microstrip technology, operating with large band, preferably in band C centred on a frequency of 5.3 GHz. Receiver 1 and transmitter 2 each comprise a 2×2 array of microstrip radiating elements, or patches, 1' and 2', respectively, arranged upon the surface of a rectangular support member 3, made in thermally stable material, preferably dielectric laminated dual-plated material, even more preferably comprising Duroid. Receiver 1 and transmitter 2 are adapted to receive and to transmit, respectively, a linearly polarised electromagnetic wave. Preferably, the receiver 1 and the transmitter 2 have an antenna gain value in the range of 6 dBi to 18 dBi, more preferably equal to 16 dBi. Support member 3 is provided with a metal diaphragm 4 adapted to decouple the receiver 1 and the transmitter 2 from one another, since they operate at the same operation frequency and, therefore, they ought to be separated from one another in order to prevent any oscillation effect; preferably, the height of the diaphragm is in the range of 3 cm to 7 cm, as a function of the arrays of the receiver 1 and of the transmitter 2 as well as of their distance from one another.

Figure 3:
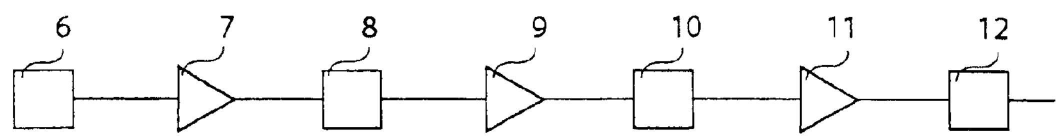
FIG. 3 shows a circuit block diagram of the amplifier unit in the transponder of FIG. 1.

Receiver 1 is connected to transmitter 2 by means of an amplifier unit 5 having high phase stability. By referring to FIG. 3, it can be observed that amplifier unit 5 is made by arranging three cascade connected amplifier stages upon a single microstrip, interconnected with one another by suitable coupling or matching stages. In particular, the amplifier unit 5 comprises the following cascade connected components:

an input coupling network 6, a first amplifier stage 7, made in pseudomorphic high electron mobility transistor (or PHEMT) technology;

an interstage coupling network 8, equal to the input coupling network;

a second amplifier stage 9;

a 50 ohm planar coupling line 10;

a third amplifier stage 11; and an output 50 ohm planar coupling line, equal to the above quoted planar line 10.

Considered as a whole, the amplifier unit 5 has a noise figure or NF no higher than 2 dB and a gain value no lower than 40 dB.

Figure 4:
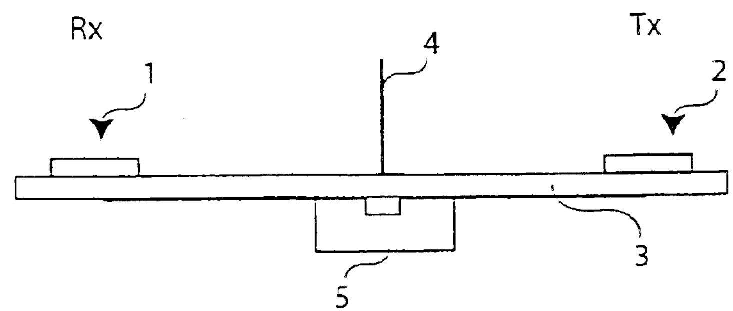
FIG. 4 shows a front view of a second embodiment of the transponder according to this invention.

By referring to FIG. 4, it can be observed that, in a second embodiment of the transponder according to this invention, the amplifier unit 5 is directly integrated at the output of the receiver 1 on a microstrip connecting this receiver to transmitter 2.

Figure 5:
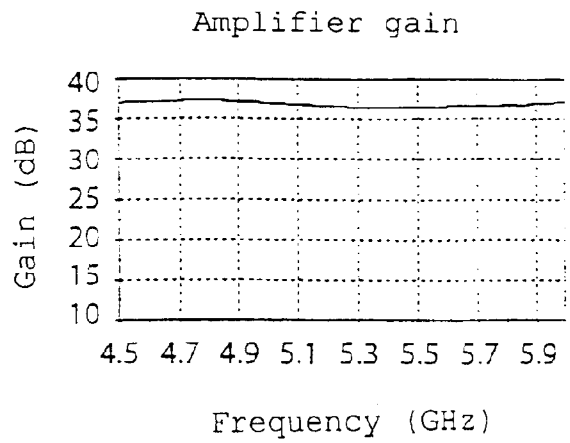
FIG. 5 shows a graph of the gain behaviour of the amplifier unit in the transponder of FIG. 1 as a function of the frequency.
Figure 6:
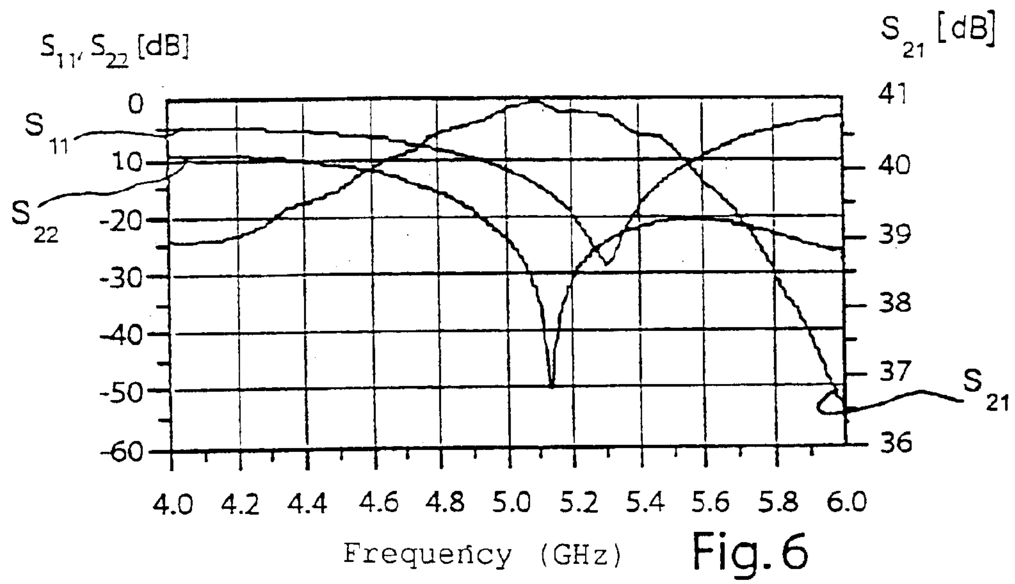
FIG. 6 shows a first graph of the behaviour of the S parameters of the amplifier unit of FIG. 1 as a function of the frequency.
Figure 7:
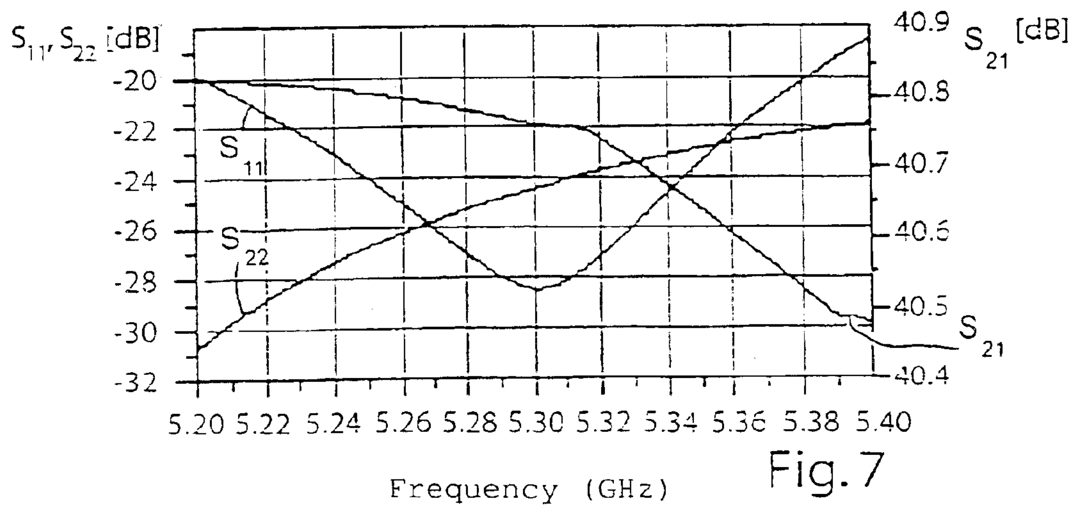
FIG. 7 shows a second graph of the behaviour of the S parameters of the amplifier unit of FIG. 1 as a function of the frequency.

FIG. 5 illustrates the behaviour of the gain of the amplifier unit 5 as a function of the frequency, while FIGS. 6 and 7 illustrate, respectively, the behaviour of the S-parameters of the amplifier unit 5 as a function of the frequency, in the frequency range of 4 GHz to 6 GHz and in the range of 5.2 GHz to 5.4 GHz, respectively. It is evidenced that parameter $s_{21}$ appears to be particularly stable in the range of the operation frequency of 5.3 GHz. Furthermore, the phase shift of the parameter $s_{21}$ when the temperature varies in the range of −30° C. to +60° C. is lower less than 0.8°.

Figure 8:
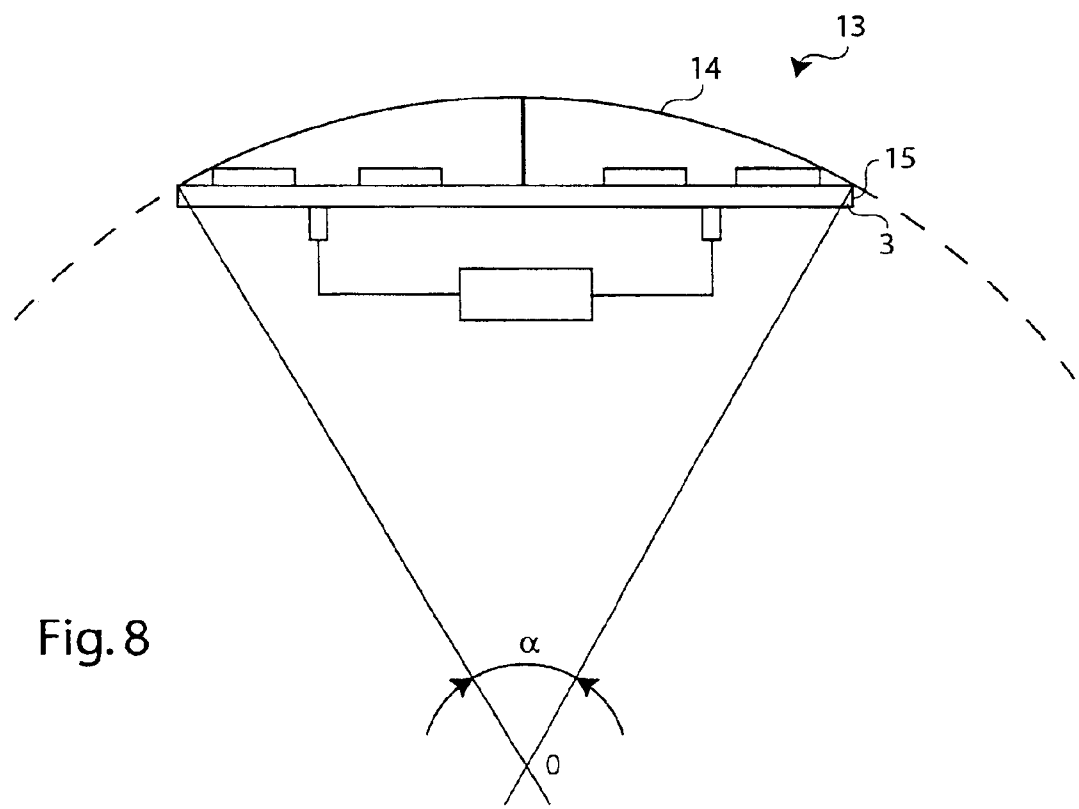
FIG. 8 shows a cross-section view of the transponder of FIG. 1, including the radome.

By referring to FIG. 8, it can be observed that the transponder according to this invention further comprises a radome 13 made with a material having a negligible impact on the radiative properties of the receiver 1 and transmitter 2 arrays at the operation frequencies. According to the preferred embodiment of the transponder, the material for the radome 13 comprises fibre glass and/or Teflon. Furthermore, the concerned radome 13 ought to have a shape and a thickness adapted to minimise the reflection of the wave irradiated from the transmitter 2 to the receiver 1, in order to maintain an high decoupling relation therebetween. According to the preferred embodiment of the transponder, the radome 13 comprises a first portion 14 having the shape of a cylindrical sector with an angular width α no larger than 90°, even more preferably no larger than 60°, rigidly connected to a second portion 15, having a rectangular cross-section, intended for resting on the support member 3. Preferably, the thickness of the first portion 14 is no higher than 0.5 mm and even more preferably it is no higher than 0.2 mm. Advantageously, the shape of the radome is adapted to prevent any atmospheric materials, such as snow or rain, from accumulating on the radome surface through which the electromagnetic waves interacting with the receiver 1 and the transmitter 2 are passed.

The transponder according to this invention has such a phase stability as to introduce phase shifts depending on the temperature variations no higher than 20°, preferably no higher than 15°, and a CS figure no lower than 30 dBsqm, preferably no lower than 34 dBsqm.

The concerned transponder is preferably supplied by a stable continuous power supply of 12 V±0.3 V. Advantageously, the concerned transponder, the power requirements of which are equal to about 2 W, can be provided with a solar cell power supply, with batteries and with a control digital unit that energises the transponder only during a restricted time interval corresponding to overhead passage of a satellite (or other aircraft periodically passing overhead the transponder) having a radar transmit antenna mounted thereon.

Figure 9:
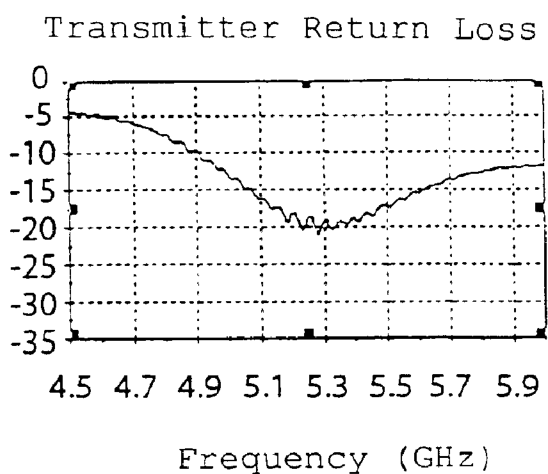
FIG. 9 shows a graph of the frequency behaviour of the return losses as measured for the transmitter of the transponder of FIG. 1.
Figure 10:
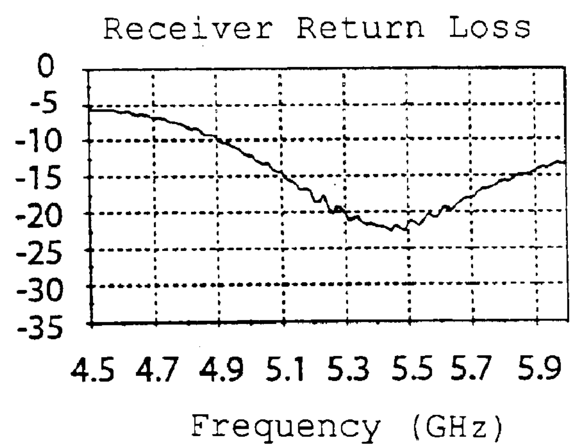
FIG. 10 shows a graph of the frequency behaviour of the return losses as measured for the receiver of the transponder of FIG. 1.

FIGS. 9 and 10 illustrate the behaviour of the return losses as a function of the frequency, as measured in respect of the arrays of the transmitter 2 and of the receiver 1, respectively: it can be observed that such losses are in the range of about −20 dB at the operation frequency of 5.3 GHz.

Figure 11:
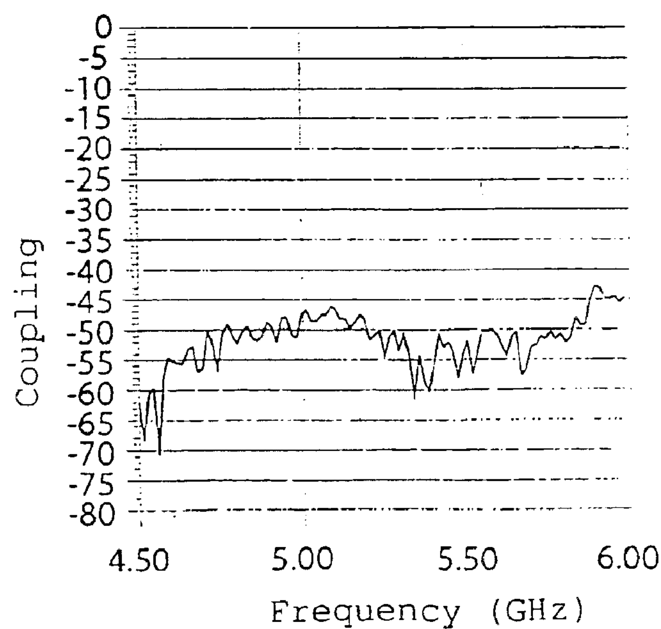
FIG. 11 shows a graph of the frequency behaviour of the coupling between the transmitter and the receiver in the transponder of FIG. 1.

FIG. 11 illustrates the behaviour of the coupling between transmitter 2 and receiver 1 as a function of the frequency: it can be observed that such coupling is always lower than −50 dB at frequencies near to 5.3 GHz, thereby evidencing the efficiency of the diaphragm 4 and of the radome 13.

Aiming at obtaining a correct operation of the transponder also in electromagnetically contaminated environments or in the presence of significant electromagnetic interferences, a third embodiment of the transponder according to this invention comprises a band pass filter inserted between the receiver and the amplifier, namely connected to the input of the amplifier; preferably the band pass filter is made by a microstrip technology. The width of the pass band of this band pass filter is equal to a percentage of the central frequency (of the frequency band of the transponder), variable in the range of 10% to 20%: such a band width is neither excessively restricted, in order that the concerned filter have no phase instability under variable temperature, nor excessively extended, in order that the filter be able to eliminate possible interferences.

Figure 12:
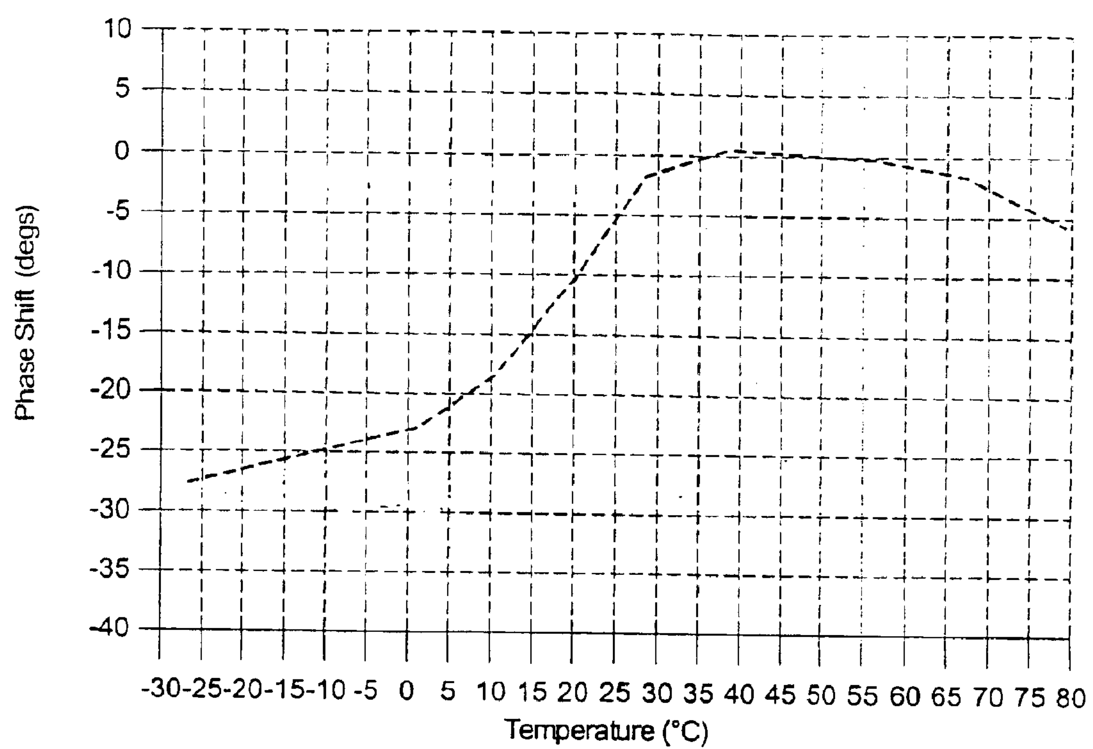
FIG. 12 shows a graph showing the behaviour of the phase shift introduced by the amplifier means as a function of the temperature variations in a third embodiment of the transponder according to this invention.

FIG. 12 illustrates the behaviour of the maximum phase shift introduced by the assembly of the band pass filter and of the amplifier as a function of the temperature variations into the transmitted signal in the third embodiment of the transponder: it is immediately apparent that the phase shift is less than ±15° in the temperature range of −30° C. to +80° C. This means that the phase shift per unit temperature variation is equal to 15°/110° C.=0.14 phase grades/° C., which is an excellent result.

Figure 13:
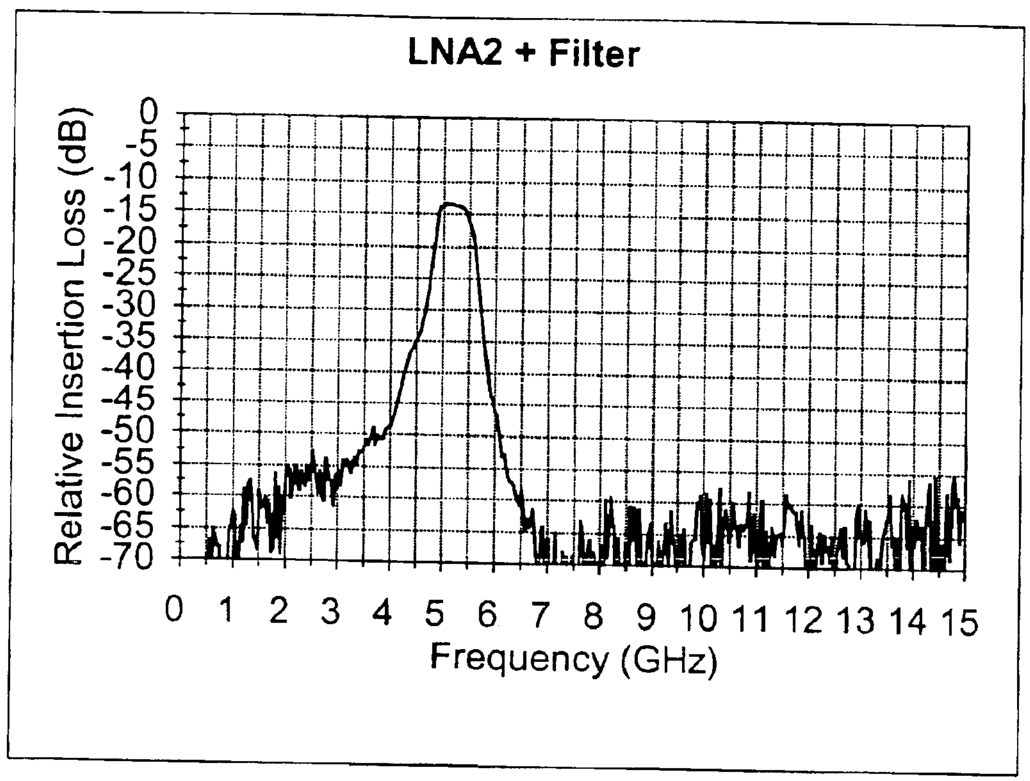
FIG. 13 shows a graph of the frequency behaviour of the relative insertion losses of the amplifier means of the third embodiment of the transponder according to this invention.

FIG. 13 illustrates the frequency behaviour of the relative insertion losses of the assembly of the band pass filter and of the amplifier of the third embodiment of the transponder. In particular, the band pass filter introduces a loss of 2 dB, while the amplifier has a gain of 46 dB; therefore, the gain of the assembly of the two components is equal to 44 dB. FIG. 13 clearly evidences the gain and the frequency selectivity of the filter and amplifier assembly; the width of the pass band of the band pass filter is equal to about 600 MHz.

The decoupling figure between the transmitter and the receiver ought to be always higher than the total gain of the transponder by an amount no less than 5 dB, more preferably 10 dB. Anyway, this could also not be true in all those cases in which the gain of the transponder is very high, thereby generating consequently an amplifying loop between the transmitter and the receiver which is prejudicial for the operation of the transponder. In such cases, aiming at increasing the decoupling figure between the transmitting antenna and the receiving antenna, thereby enhancing the transponder functionality and increasing the maximum achievable RCS value, the third embodiment of the transponder also utilises purposely shaped, radio frequency signal absorbing panels. Such absorbing panels, combined with the metal diaphragms, further minimise the coupling between the transmitter and the receiver, by absorbing the transmitted radiation irradiated toward the receiver. In particular, the absorbing panels are preferably arranged aside and parallel to a central metal diaphragm.

Figure 14:
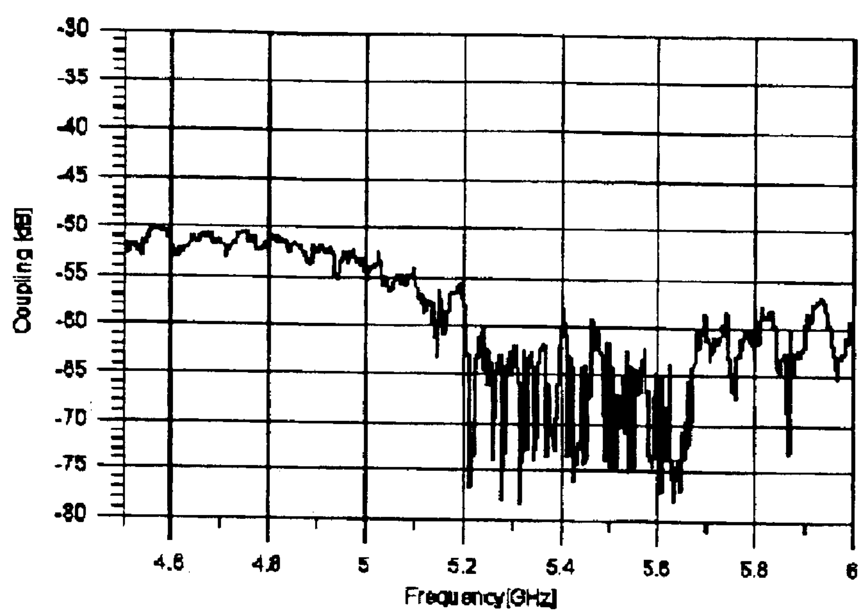
FIG. 14 shows a graph of the frequency behaviour of the coupling between the transmitter and the receiver of the third embodiment of the transponder according to this invention.

FIG. 14 illustrates the behaviour of the coupling figure between the transmitter 2 and the receiver 1 of the third embodiment of the transponder, provided with a band pass filter and absorbing panels: it can be observed that such coupling figure is always lower than −60 dB at frequencies near to 5.3 GHz.

Figure 15:
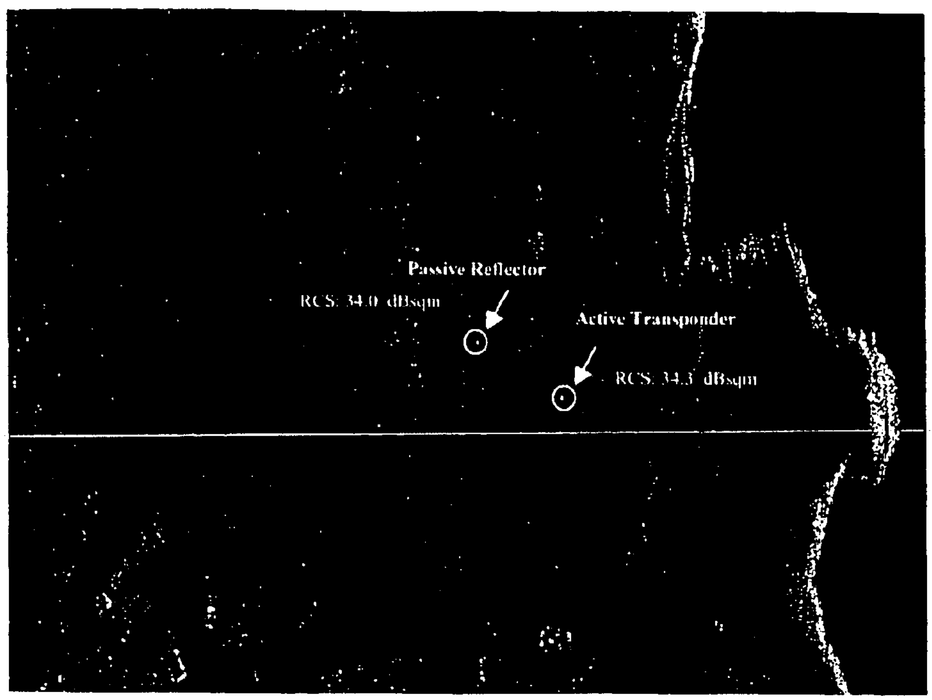
FIG. 15 shows an image from the satellite which compares a conventional passive PT to the third embodiment of the transponder according to this invention.

FIG. 15 shows an image obtained from satellite RADARSAT comparing a conventional passive PT, having dimensions of 1.4 m×1.4 m×1.4 m, to the third embodiment of the transponder according to this invention, having extremely reduced dimensions: the RCS value of the transponder according to this invention is equal to 34.3 dBsqm and is higher than the RCS value of the passive reflector, which is equal to 34.0 dBsqm.

The advantages made by the transponder according to this invention are apparent: in fact, it has extremely reduced dimensions and consequently it is easy to be handled and installed, it has an extremely high phase stability, it is inexpensive, reliable, simple and efficient.

The preferred embodiments of this invention have been described and a number of variations have been suggested hereinbefore, but it should expressly be understood that those skilled in the art can make other variations and changes, without so departing from the scope thereof, as defined by the following claims.

What is claimed is:

1. An apparatus operating as a transceiver or transponder particularly for synthetic aperture radar (SAR) systems, operating in a frequency band having a central frequency, the apparatus comprising:

a receiver;

a transmitter;

wherein both the receiver and transmitter are thermally stable and made by microstrip technology;

wherein the receiver and the transmitter are adapted to receive and to transmit, respectively, an electromagnetic wave provided with at least one linear polarisation;

wherein the receiver is connected to the transmitter by amplifier means comprising an amplifier unit for each linear polarisation of the wave received by the receiver, each amplifier unit including at least two amplifier stages cascade-arranged along a single microstrip and interconnected to one another and to an input and to an output of the corresponding amplifier unit by means of coupling or matching stages, the output signal of each amplifier unit having substantially the same frequency as the input signal thereto;

wherein the amplifier units have substantially the same gain, the gain being no lower than 25 dB;

wherein the transponder is stable so that each linear polarisation of the transmitted electromagnetic wave has phase variations in time no higher than 20°; and electromagnetic decoupling means disposed between the transmitter and the receiver.

2. An apparatus according to claim 1 wherein the transponder is phase stable so that each linear polarisation of the transmitted electromagnetic wave has phase variations in time no higher than 15°.

3. An apparatus according to claim 1 wherein the amplifier means comprises a band pass filter made in microstrip technology, connected to the input of each amplifier unit.

4. An apparatus according to claim 3 wherein each band pass filter has a pass band no less than 10% of the central frequency of the operation band of the transponder.

5. An apparatus according to claim 4 wherein each band pass filter has a pass band no less than 15% of the central frequency of the operation band of the transponder.

6. An apparatus according to claim 5 wherein each band pass filter has a pass band no less than 20% of the central frequency of the operation band of the transponder.

7. An apparatus according to claim 3 wherein each band pass filter introduces an attenuation no higher than 5 dB.

8. An apparatus according to claim 7 wherein each band pass filter introduces an attenuation no higher than 2 dB.

9. An apparatus according to any claim 1 wherein the amplifier means have a phase stability such that the output signal of each amplifier unit has phase variations in time no higher than 15°.

10. An apparatus according to claim 9 wherein the amplifier means has a phase stability such that the output signal of each amplifier unit has phase variations in time no higher than 9°.

11. An apparatus according claim 1 wherein each amplifier unit has a gain no lower than 35 dB.

12. An apparatus according to claim 11 wherein each amplifier unit has a gain no lower than 40 dB.

13. An apparatus according to claim 1 wherein the amplifier means has a Noise Figure (NF) value no higher than 5 dB.

14. An apparatus according to claim 13 wherein the amplifier means has a NF value no higher than 2 dB.

15. An apparatus according to claim 14 wherein the receiver and the transmitter have a frequency band no less than 15% of the central frequency of the operation band of the apparatus.

16. An apparatus according to claim 15 wherein the receiver and the transmitter have a frequency band no less than 20% of the central frequency of the operation band of the apparatus.

17. An apparatus according to claim 1 wherein the receiver and the transmitter have a frequency band no less than 10% of the central frequency of the operation band of the apparatus.

18. An apparatus according to claim 1 wherein the receiver has such a phase stability as to introduce into the received electromagnetic wave a phase variation in time of no more than 5°, and in that the transmitter has such a phase stability that the transmitted electromagnetic wave has a phase variation in time of no more than 5°.

19. An apparatus according to claim 18 wherein the receiver has such a phase stability as to introduce into the received electromagnetic wave a phase variation in time of no more than 3°, and in that the transmitter has such a phase stability that the transmitted electromagnetic wave has a phase variation in time of no more than 3°.

20. An apparatus according to claim 1 wherein the apparatus is adapted to operate at temperature values in the range of −40° C. to +80° C.

21. An apparatus according to claim 1 wherein the receiver and the transmitter each comprise at least one micro strip radiating element or patch, arranged on a support surface and made of a thermally stable material.

22. An apparatus according to claim 21, wherein the receiver and the transmitter each comprise a single patch.

23. An apparatus according to claim 21, wherein the receiver and the transmitter each comprise a square array of 2×2 patches.

24. An apparatus according to claim 21 wherein the support is made of a laminated dielectric dual-plated material.

25. An apparatus according to claim 24 wherein the support comprises Duroid.

26. An apparatus according to claim 1 wherein at least one amplifying stage includes a pseudomorphic high electron mobility transistor (PHEMT) stage.

27. An apparatus according to claim 1 wherein at least one matching stage includes a coupling network.

28. An apparatus according to claim 1 wherein at least one matching stage includes a 50 ohm planar coupling line.

29. An apparatus according to claim 1 wherein the amplifier means are directly integrated at the output of the receiver, so that each amplifier unit is directly integrated on each connection microstrip between a corresponding output of the receiver and a corresponding input of the transmitter.

30. An apparatus according to claim 29, wherein each band pass filter is directly integrated on the microstrip of the corresponding amplifier unit.

31. An apparatus according to claim 1 wherein each amplifier unit includes three amplifying stages.

32. An apparatus according to claim 1 wherein each amplifier unit includes four amplifying stages.

33. An apparatus according to claim 1 wherein the apparatus has a radar cross section (RCS) figure of no less than 20 dBsqm.

34. An apparatus according to claim 33 wherein the apparatus has a RCS figure of no less than 25 dBsqm.

35. An apparatus according to claim 34 wherein the apparatus has a radar cross section or RCS figure of no less than 30 dBsqm.

36. An apparatus according to claim 35 wherein the apparatus has a RCS figure of no less than 34 dBsqm.

37. An apparatus according to claim 1 wherein the receiver and/or the transmitter have an antenna gain in the range of 6 dBi to 18 dBi.

38. An apparatus according to claim 1 wherein the receiver and the transmitter are adapted to receive and to transmit, respectively, an electromagnetic wave having a single linear polarisation.

39. An apparatus according to claim 1 wherein the apparatus operates in class C airspace.

40. An apparatus according to claim 1 further comprising a power supply comprising a digital control unit adapted to periodically activate the transponder only for a limited time duration.

41. An apparatus according to claim 40, further comprising one or more long duration or low discharge batteries as a power source.

42. An apparatus according to claim 40 wherein the power supply comprises one or more solar cells.

43. An apparatus according to claim 1 wherein the decoupling means between the transmitter and the receiver include at least one metal diaphragm.

44. An apparatus according to claim 43 wherein the decoupling means between the transmitter and the receiver further includes one or more radio frequency signal absorber panels adapted to absorb the radiation irradiated from the transmitter to the receiver.

45. An apparatus according to claim 44 wherein the absorber panels are arranged laterally and parallel with respect to the at least one metal diaphragm.

46. An apparatus according to claim 1 wherein the decoupling means between the transmitter and the receiver includes at least a portion of a radome made with a material having a negligible impact on the radiative properties of the receiver and the transmitter at the operation frequencies as well as a shape and a thickness adapted to make the reflection of the wave irradiated from the transmitter to the receiver substantially negligible.

47. An apparatus according to claim 46 wherein the material of the portion of the radome comprises fibreglass and/or a non-stick surface.

48. An apparatus according to claim 46 wherein the portion of the radome has a cylindrical sector shape with an angular width α no greater than 90°.

49. An apparatus according to claim 48 wherein the portion of the radome has a cylindrical sector shape with an angular width α no greater than 60°.

50. An apparatus according to claim 46 wherein the portion of the radome has a thickness no greater than 0.5 mm.

51. An apparatus according to claim 50 wherein the portion of the radome has a thickness no greater than 0.2 mm.

* * * * *